United States Patent
Baird

(10) Patent No.: US 9,469,557 B1
(45) Date of Patent: Oct. 18, 2016

(54) OZONATING WATER TREATMENT AND FILTRATION APPARATUS

(71) Applicant: James Baird, Occidental, CA (US)

(72) Inventor: James Baird, Occidental, CA (US)

(73) Assignee: Alberic Corporation, Sebastopol, CA (US)

(*) Notice: Subject to any disclaimer, the term of this patent is extended or adjusted under 35 U.S.C. 154(b) by 611 days.

(21) Appl. No.: 14/030,827

(22) Filed: Sep. 18, 2013

Related U.S. Application Data

(60) Provisional application No. 61/702,346, filed on Sep. 18, 2012.

(51) Int. Cl.
*C02F 1/78* (2006.01)
*C02F 9/00* (2006.01)
*C02F 1/42* (2006.01)

(52) U.S. Cl.
CPC . *C02F 1/78* (2013.01); *C02F 1/42* (2013.01); *C02F 9/00* (2013.01); *C02F 2303/16* (2013.01)

(58) Field of Classification Search
None
See application file for complete search history.

(56) References Cited

U.S. PATENT DOCUMENTS

| 4,043,913 A * | 8/1977 | Hintermeister | C02F 1/78 210/167.11 |
| 8,764,989 B2 * | 7/2014 | Minnix | C02F 1/78 210/760 |
| 2013/0075313 A1 * | 3/2013 | Handy | C02F 1/42 210/141 |

* cited by examiner

*Primary Examiner* — Terry Cecil
(74) *Attorney, Agent, or Firm* — Gary Hoenig

(57) ABSTRACT

An ozonating water treatment and filtration apparatus is provided wherein a groundwater containing contaminates including hydrogen sulfide, ferrous oxide, carbon dioxide, manganese, arsenic, coliform bacteria and other pathogens and compounds, are removed by filtration utilizing a zeolite and pea gravel filter media and by application of an oxidant using low concentrations of ozone. A silent ozone generator and injector feature provides silent operation and no ozone pumping mechanism. The apparatus is self regenerating, low cost, and low maintenance requiring few consumables and minimal user intervention.

11 Claims, 5 Drawing Sheets

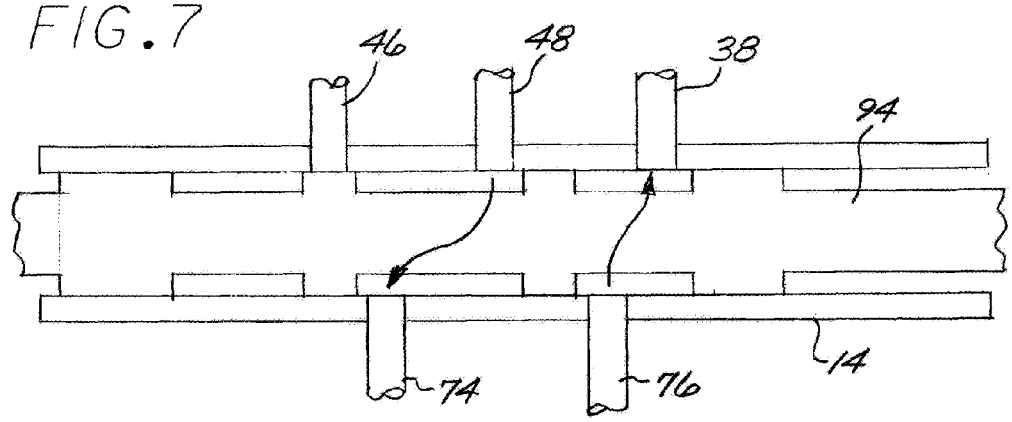
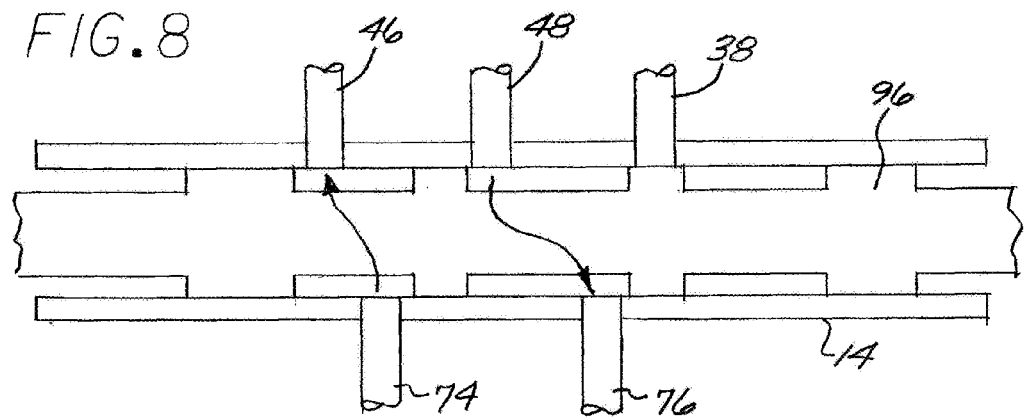

OZONATING WATER TREATMENT AND FILTRATION APPARATUS

RELATED APPLICATIONS

This non-provisional utility patent application, filed in the United States Patent and Trademark Office, is a Continuation of U.S. Provisional Patent Application Ser. No. 61/702,346, filed Sep. 18, 2012, from which priority is claimed and whose disclosure is hereby incorporated by reference in its entirety.

FIELD OF THE INVENTION

The present invention relates to the field of water treatment. More particularly, this invention is directed to a self regenerative ozonating water treatment and filtration apparatus for the purification of groundwater.

BACKGROUND OF THE INVENTION

Groundwater is frequently contaminated with hydrogen sulfide, ferrous oxide, carbon dioxide, manganese, arsenic, coliform bacteria and other pathogens and compounds. For the water to be made potable these impurities must be removed. Consequently water drawn from wells or other natural sources typically requires some form of water treatment and filtration that is often complex and high maintenance. The contaminates can be removed with prior art water treatment devices utilizing oxidants and various filter media; however, these devices suffer from high maintenance due to non-regenerative filter beds, consumable and hazardous oxidants, mechanically complex and often unreliable equipment and from complications related to not being integrated with water supply storage. Further, prior art devices typically utilize pumping mechanisms that are noisy and prone to failure, features undesirable particularly for residential installations.

What is needed is a reliable, low cost, low maintenance and efficient water treatment apparatus. In view of the limitations of the prior art, the herein disclosed invention is provided to overcome the many disadvantages.

SUMMARY OF THE INVENTION

Accordingly, it is an object of the present invention to provide a new type of water treatment and filtration apparatus suitable for groundwater contaminate removal, having high reliability, simplicity, low maintenance, low complexity, low operation noise levels, and low cost thereby overcoming the various disadvantages of the prior art.

The present invention is a self regenerative ozonating water treatment and filtration apparatus capable of removing commonly encountered contaminates including hydrogen sulfide, ferrous oxide, carbon dioxide, manganese, arsenic, coliform bacteria and other pathogens, by integrating chemical oxidation with low levels of ozone and filtration through a zeolite based medium. The present invention is particularly well suited for processing contaminated source water from a residential well, spring or stream wherein the source water is stored in a typical residential water storage cistern tank having a capacity of 2,500 gallons to 5,000 gallons, although the present invention is suitable for other similar applications. Additionally, the disclosed invention has high reliability, few consumables, a low noise operation, low cost, and low maintenance features as further advantages.

The present invention is integrally installed with a water storage tank wherein water is circulated from the storage tank through a filter bed comprising a zeolite portion and a pea gravel portion, through an ozone injector and diffuser mechanism, a sight glass for observing flow, and returned to the water storage tank wherein the ozone in the returned filtered water is bubbled through the water in the storage tank. The ozone is introduced at low concentrations into the return flow to perform as an oxidant for oxidizing contaminates, both organic and inorganic compounds, and as a disinfectant for bacteria and pathogens. The repeated circulation of the storage tank water through the apparatus rapidly removes the offending contaminates to potable levels.

Oxidation with ozone and filtration removes contaminants from groundwater. The geochemistry is such that iron exists as water soluble $Fe^{2+}$ and arsenic as water soluble $As^{3+}$ and manganese as $Mn^{2+}$. These water soluble minerals are oxidized to the insoluble higher oxidation states which precipitate and are removed by filtration. Hydrogen sulfide is oxidized to sulfate and carbon dioxide is displaced by oxygen. The precipitates as well as oxidized organics are removed by filtration and absorption into the zeolite. The zeolite is regenerated via backwashing at a preset interval. The interval is adjusted to match the approximate rate of loading with the precipitated contaminants.

During normal operation the water flow rate through the filter bed slows as the bed accumulates precipitates, contaminates and debris. As indicated, supra, backwash of the filter bed is required to regenerate the filter bed and to flush out the accumulated precipitates, contaminates and debris. In the regeneration mode, treated water in the storage tank or source water is pumped through the filtered in the reverse direction and discharged to a drain. Regeneration mode requires a different configuration of the various valves from the normal operation mode to produce the reverse flow. A control unit with user interface and being in direct electronic communication with the various valves incorporated in the apparatus, provides a means for a user to configure the apparatus for normal or regeneration modes and to program the time interval between and the duration of normal and regeneration mode cycles automatically.

Of particular noteworthiness and distinction over the prior art is the unique feature of injecting ozone into the filtered water stream from the filter bed in normal operation. Prior art ozone injection pumps typically utilize vibrating bellow type pumps to push ozonated air through the system. These types are pumps are known for buzzing loudly during operation and for being maintenance prone. According to the present invention, ozone is drawn into the water stream from the filter bed by a reduced pressure created by the water stream from the filter bed flowing through a down pipe pulling the water flow past an ozone injector. Ozone is drawn through the injector, utilizing a Venturi effect, thereby eliminating the need for an ozone pump. In the present invention ozone is generated by drawing air into a cylindrical container containing an ultraviolet (UV) lamp and through to the ozone injector by the negative pressure from the ozone injector Venturi effect. As air is drawn past the lamp and irradiated by the UV, oxygen in the air is converted to ozone. The mechanism according to the present invention is silent, reliable and low maintenance.

A visual flow indicator sight glass is provided to give a qualitative indication of the flow rate through the apparatus. Reflective streamers flutter faster at higher flow rates. Low flutter during normal operation mode when the apparatus is activated indicates that there may be a mechanical fault or that the filter bed may require maintenance or regeneration.

No flutter during normal operation mode when the apparatus is activated indicates that the apparatus requires maintenance. Bubbles of ozonated air are also visible during normal operating conditions.

In a typical water storage cistern tank, as required in many regions, water treated water is pumped from the tank to the residence. The present invention circulates water drawn from the storage tank and returns treated water to the tank, thereby facilitating simple installation to existing storage tanks. As water is drawn from the storage tank, make up or top up water is required to fill the tank. In normal operation the circulated water is drawn from the storage tank; however, when additional top up groundwater is required, the circulation draw is stopped and groundwater from the source is instead directed into the water treatment apparatus filter inlet.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

FIG. 7 is a schematic view of the flow paths within the regeneration valve wherein the flows and valve positions are illustrated in the normal operation mode.

FIG. 8 is a schematic view of the flow paths within the regeneration valve wherein the flows and valve positions are illustrated in the regeneration mode.

DETAILED DESCRIPTION OF THE INVENTION

Figure 1:
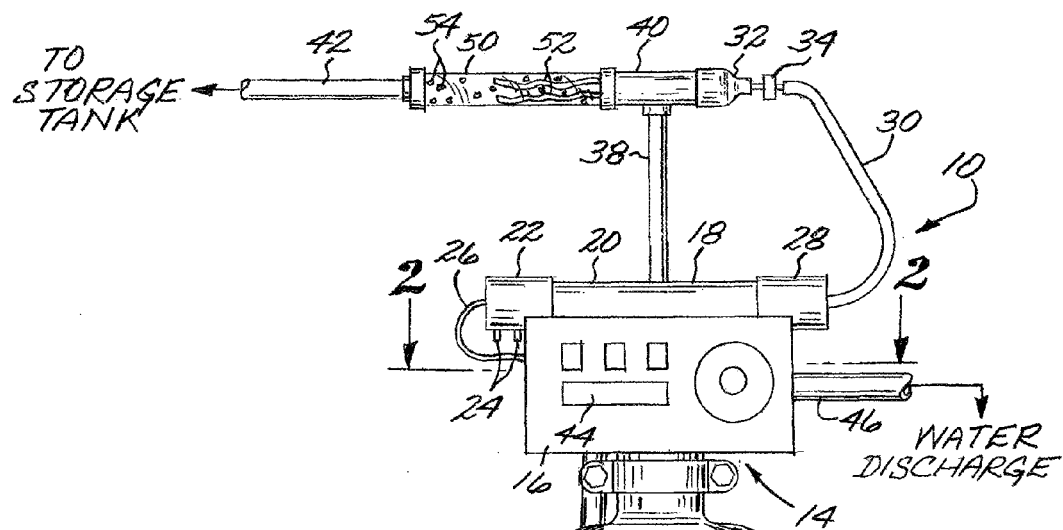
FIG. 1 is a front elevation view of an embodiment of the water treatment and filtration apparatus according to the present invention wherein the essential features of the apparatus are visible including the filter tank, controller, ozone generator, view glass, and circulating pump.
Figure 1:
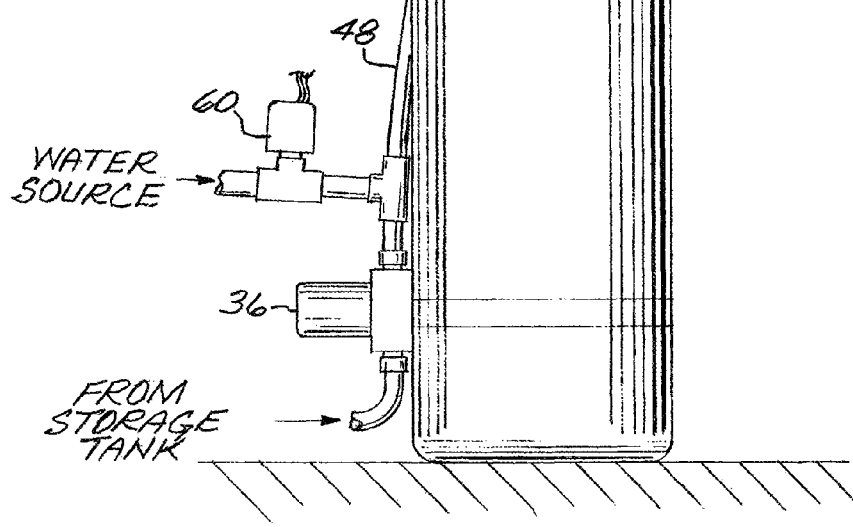

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in a front elevation view at 10 in FIG. 1, a new type of self regenerative ozonating water treatment and filtration apparatus.

Referring now to FIG. 1, the water treatment and filtration apparatus 10 comprises a fiberglass filter tank 12 containing a filter bed, a regeneration control valve 14 in direct fluid communication with the filter tank 12, the valve 14 having an inlet in direct fluid communication with a water source to be treated and a circulating pump 36 drawing water from a water storage tank, the valve 14 further having an outlet port connected to outlet pipe 38 vertically ascending and perpendicularly fixed to a horizontally disposed outlet cylinder 40, the outlet cylinder 40 further comprises an ozone injector 32 fixed to the proximate, the distal end of the outlet cylinder 40 receives an outlet line 42 being in direct fluid communication with the water storage tank 82, ozone injector 32 being in direct gas communication with an ozone generator 18; and a control unit 16 with user interface 44, being in direct electrical communication with the various valves, pumps and ozone generator, programmed and operable to activate and deactivate the various valves, pumps, and ozone generator, in sequences and combinations commensurate with a normal treatment and filtration mode, and alternatively with a regeneration mode.

Figure 5:
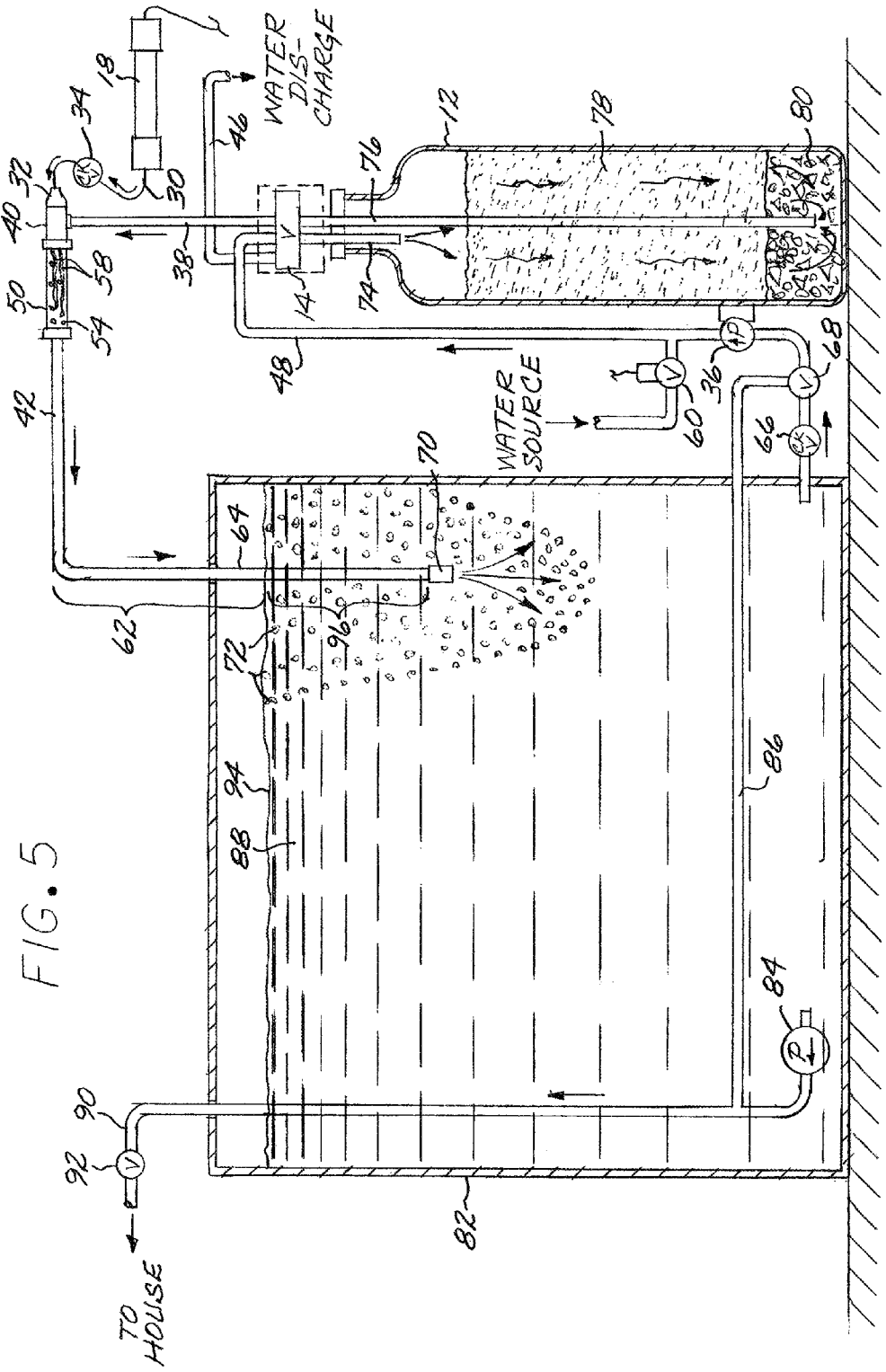
FIG. 5 is a schematic view of an embodiment of the water treatment and filtration apparatus according to the present invention illustrating the apparatus installed on a typical water cistern storage tank and showing the flow through the apparatus and the various valve positions in a normal operation water treatment mode.
Figure 6:
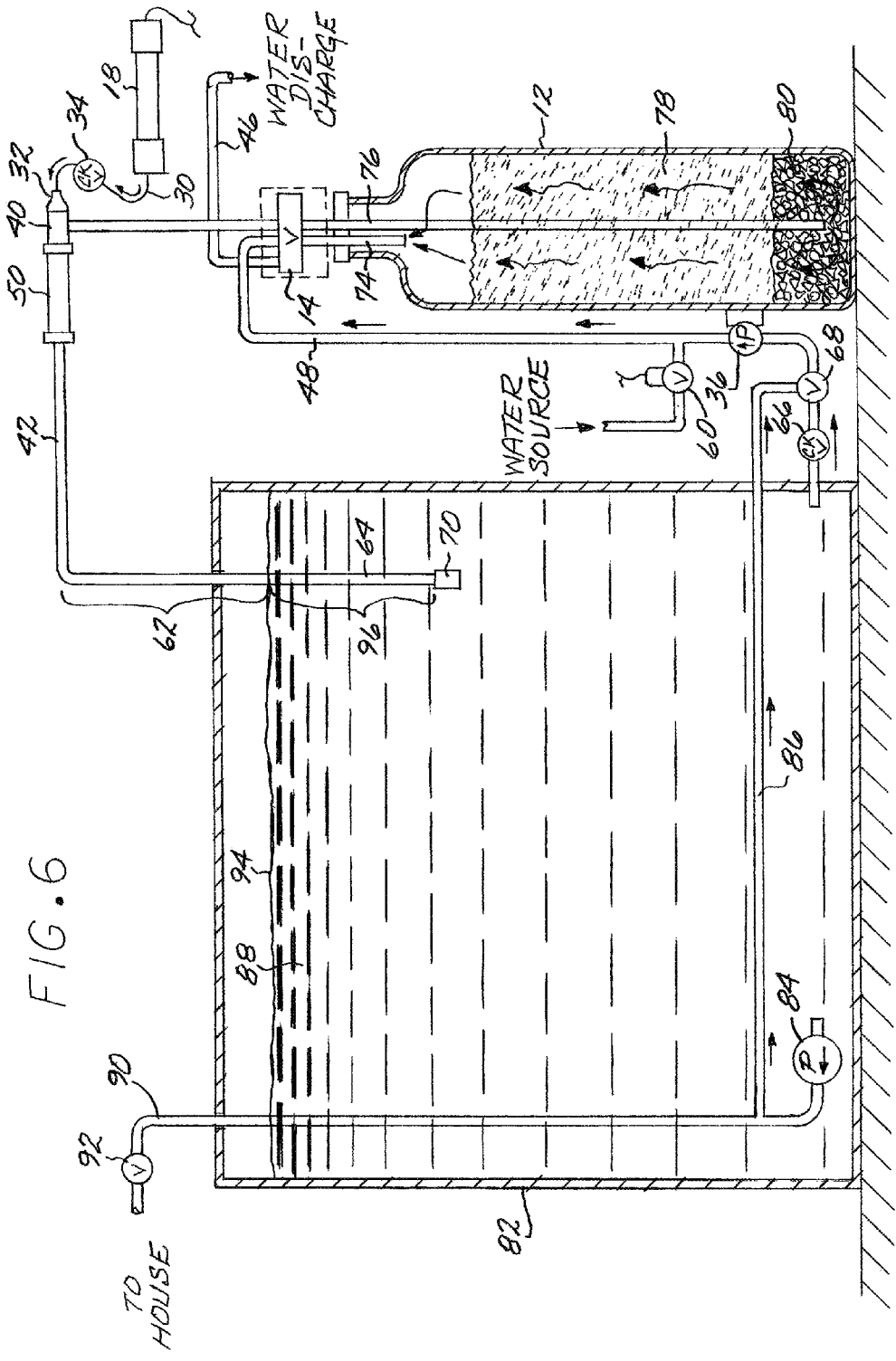
FIG. 6 is a schematic view of an embodiment of the water treatment and filtration apparatus of FIG. 5 showing the flow through the apparatus and the various valve positions in a regeneration mode.

As shown in FIGS. 5 and 6, the filter tank 12 is preferably constructed of fiberglass and comprises an outlet manifold pipe 76 fixed inside to the top of the tank 12 and extending downwardly to the bottom of the tank 12, an inlet port 74 providing flow into the top of the tank 12, and a filter bed comprising a lower portion 80 being pea gravel disposed within the bottom of the filter tank in sufficient quantity to cover the bottom end of the outlet manifold 76, and an upper portion 78 of 80% natural zeolite, preferably being clinoptilolite or mordenite or a combination thereof, in sufficient quantity to fill the remainder of the filter tank 12; however, the zeolite media must not block the inlet port 74 of the filter tank 12 located near the top of the filter tank 12. The filter bed removes solids precipitated by oxidation with ozone from the ozone generator 18 as well as other debris.

Ozone, in concentrations of approximately 1 ppm to 3 ppm, is generated by an ozone generator 18 comprising a cylinder 20 having a proximate end cap 22 with air inlet ports 24 and an electrical cable 26 being in direct electrical communication with a 254 nm ultraviolet lamp centrally disposed within the cylinder 20. The distal end cap 28 of the ozone generator 18 receives the proximate end of the ozone delivery tube 30. The ozone delivery tube distal end is attached to an ozone injector 32 providing gas flow from the ozone generator 18 to the ozone injector 32. An ozone check valve 34 may optionally be disposed between the ozone delivery tube 30 and the ozone injector 32 as illustrated in FIG. 1. The ozone injector 32 performs as a diffuser to mix ozone laden air with water flowing through the apparatus. Control unit 16 is in direct electrical communication with the ozone generator 18 through electrical cable 24 and selectively activates the ultraviolet lamp when water is flowing through the apparatus in normal operating mode. It will be appreciated that although the oxygen flowing through the ozone generator is not entirely converted to ozone and other gases in the air remain. The ozone laden gas therefore also aerates water flowing through the apparatus.

Figure 3:
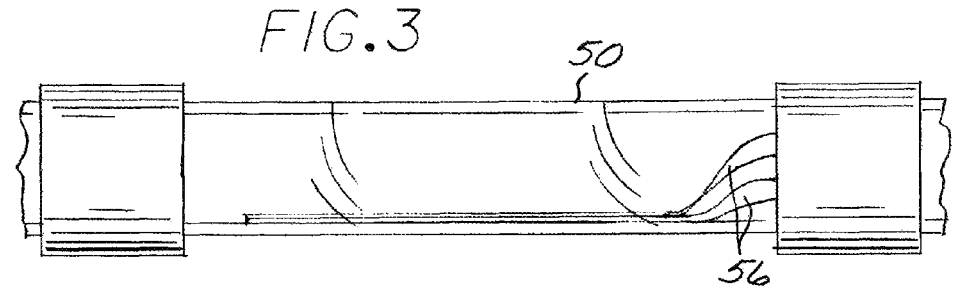
FIG. 3 is a front elevation view of the flow sight glass mechanism element according to the present invention showing a no flow condition.
Figure 4:
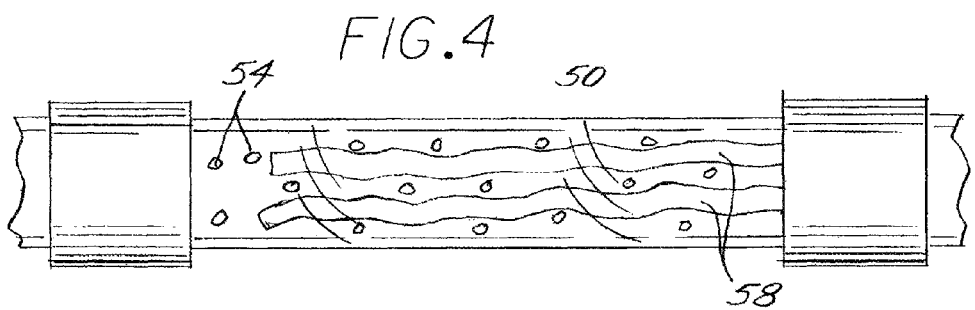
FIG. 4 is a front elevation view of the flow sight glass mechanism element of FIG. 3 showing a normal flow condition.

An optional sight glass 50 tube may be disposed within the outlet cylinder 40 to provide a mechanism for a user to observe the flow rates through the apparatus. As illustrated in FIG. 1, streamers 52 fixed to the outlet cylinder 40 and provide a qualitative indication of the flow rate. In FIG. 3, the streamers are idle and laying flat at 56 across the bottom of the sight glass 50 indicating no flow. Similarly, as shown in FIG. 4, the same streamers are now fluttering vigorously in the water flow at 58 within the sight glass 50 indicating high flow rates. Ozonated air bubbles 54 further indicate normal operation.

Referring now to FIG. 5 illustrating a typical installation of the present invention on a water storage tank 82 and in normal operating mode, water is drawn and circulated from the water storage tank 82 through inlet check valve 66 and through regeneration source valve 68 to the circulating pump 36 delivering water to the inlet port of the filter tank 12. A typical 1/15 HP pump 36 is sufficient in most applications to deliver at least 4.5 gallons per minute flow rate. The water is now dispersed across the top of the zeolite of the upper portion 78 of the filter bed, through the zeolite and pea gravel of the lower portion 80 of the filter bed up through the bottom end of the outlet manifold 76 exiting the filter tank 12, through the outlet pipe 38 to the outlet cylinder 40 and returning to the storage tank 82 by way of a vertically disposed tank return pipe 64 and into the storage tank 82. The tank return pipe 64 has an upper portion 62, the down pipe, extending to the top of the water 94 and a lower portion 96, extending further into the contents of the water tank 82. In order for the ozone injector 32 to perform properly, the length of the down pipe 62 must provide at least a vertical 2.5 foot drop from the level of the outlet cylinder 40 to the highest water level 94 in the storage tank 82. The vertical drop provides a reduced pressure at the ozone injector 32 thereby drawing ozone into the system. It is also preferable to provide a 5 degree drop of the outlet line 42 along the horizontal run to the top end of the vertically disposed tank return pipe 64. The tank return pipe 64 lower portion 96 has a length sufficient to extend 3 feet below the level of the water in the storage tank 82. An optional diffuser 70 may be installed at the bottom of the tank return pipe 64 to create smaller bubbles 72 and hence more ozone contact with the water 88. Top up water from the water source is selectively introduced by opening the water source valve 60 thereby allowing flow through the filter inlet pipe 48 to the inlet port 74 of the filter tank 12.

In the regeneration mode as in FIG. 6, the valves are now configured to deliver water from the storage tank to the outlet manifold 76 of the filter tank 12 thereby backwashing the filter bed 78, 80 wherein flow is reversed through the inlet port 74 of the filter tank 12 and directed out to a drain through the water discharge line 46. Note that treated water 88 is normally delivered by submerged pump 84 to the house through house delivery line 90 and shutoff valve 92. In regeneration mode, this same water, having a higher pressure than can be produced by circulating pump 36, may optionally be used to backwash the filter tank 12 by activating the regeneration source valve 68. Similarly, the various valves may be optionally configured to utilize source water for the backwash by activating source water valve 60.

Figure 2:
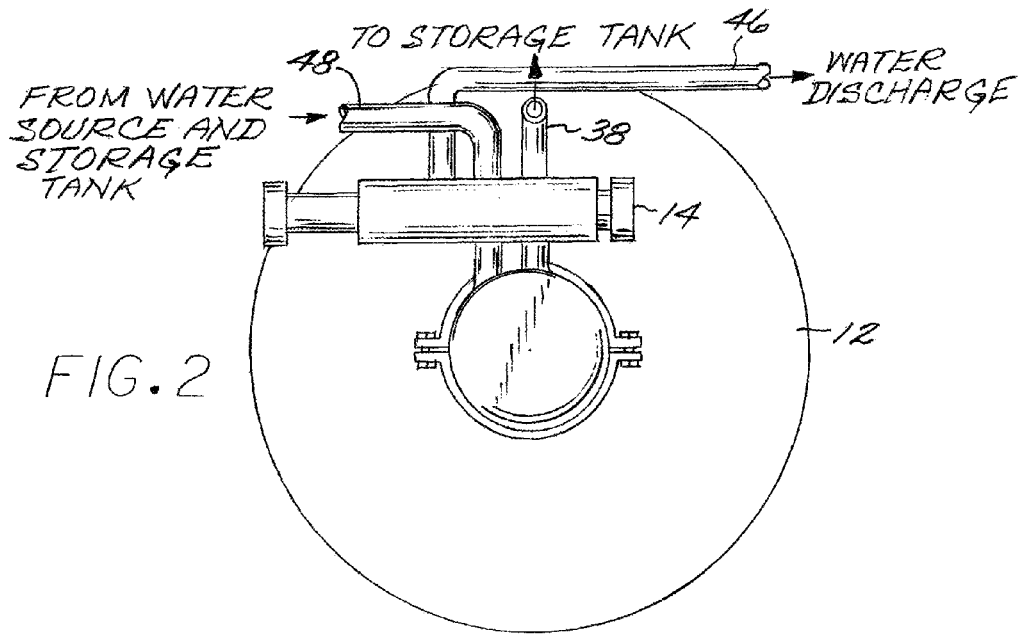
FIG. 2 is a top plan view taken on Line 2-2 of FIG. 1 illustrating the regeneration valve mechanism and pumping of the embodiment.

Details of the connections to the regeneration valve 14 mounted to the top of the filter tank 12 are illustrated in FIG. 2 wherein the outlet pipe 38 turns to vertically ascend to the outlet cylinder 40. The inlet line 48 receives water from a water source through source water valve 60 to be treated or from the circulation pump 36 mounted near the bottom of the filter tank 12. The function of valve 14 is to direct flow appropriately for normal operation mode and also for regeneration mode. In regeneration mode when the filter tank filter bed 78, 80 is backwashed, flushing water is discharge through discharge line 46 to a drain.

Valve 14 is a typical regeneration type valve. It will be appreciated that various types of regeneration valve mechanisms are available that accomplish the same flow routing so a slider type valve mechanism is illustrated in the various figures merely as an example. As illustrated in FIG. 7 showing the normal operating mode valve configuration of the slider valve piston 94 of the regeneration valve 14, water flow is routed from the filter tank outlet manifold 76 drawing water from the lower portion 80 of the filter bed in the filter tank 12 and out to the outlet pipe 38 for return to the storage tank 82. Water flows from the water source or storage tank through inlet line 48 into the inlet port 74 of the filter tank discharging water onto the top of the upper portion 78 of the filter bed.

In regeneration mode, the slider valve piston 96 of the regeneration valve 14 is now positioned to route water flow as illustrated in FIG. 8, wherein the flow through the filter tank 12 is now reversed. Water from the storage tank 12 is now routed through inlet line 48 back through the filter tank outlet manifold 76 forcing water to the bottom of the filter tank, through the pea gravel of the lower portion 80 of the filter bed, up through the zeolite of the upper portion 78 of the bed and out the inlet port 74 to the discharge line 46 to a drain, thereby effecting the backwash of the filter bed.

For efficient operation, the water tank 82 should be of sufficient size to equal 3 times the volume of treated water 88 or liquid required per day of use.

While embodiments of this invention have been illustrated and described, variations and modifications may be apparent to those skilled in the art. Therefore, we do not wish to be limited thereto and ask that the scope and breadth of this invention be determined from the claims which follow rather than the above description.

What is claimed is:

1. A water treatment and filtration apparatus comprising,
    a filter tank having an inlet port, an outlet manifold, and a filter bed having an upper portion and a lower portion,
    a regeneration valve fixed to the top of the filter tank having a normal operating mode and a regeneration mode,
    a vertically disposed outlet pipe, having a top and a bottom, fixed to the regeneration valve and extending upwards,
    a horizontally disposed outlet cylinder fixed to the top of the outlet pipe perpendicularly and in direct fluid communication with the outlet pipe,
    an ozone injector disposed on the proximate end of the outlet cylinder,
    an ozone generator being in direct gas communication with the ozone injector,
    a horizontally disposed outlet line fixed to the distal end of the outlet cylinder,
    a vertically disposed tank return pipe fixed to the horizontally disposed outlet line comprising an upper portion having a length of at least 2.5 feet from the outlet line to the water level in a storage tank holding storage tank water and a lower portion having a length of 3 feet extending below the water level in the storage tank arranged to present a reduced water pressure to the ozone injector to facilitate gas flow into the water; and,
    an inlet line in direct fluid communication with the regeneration valve wherein water, selected from the group consisting of storage tank water and source water, is drawn and directed through the filter bed, injected with ozone and returned as treated water to the storage tank.

2. The water treatment and filtration apparatus as in claim 1 wherein the ozone generator comprises a cylinder having an inlet, an outlet, and a centrally disposed 254 nm ultraviolet lamp wherein oxygen in the air entering the inlet is converted to ozone by the ultraviolet radiation before exiting the outlet.

3. The water treatment and filtration apparatus as in claim 1 wherein ozone injector is operable to draw gas from the ozone generator and introduce the gas into the outlet cylinder utilizing a Venturi effect thereby requiring no pump.

4. The water treatment and filtration apparatus as in claim 1 further comprising a control unit having a user interface and being in direct electronic communication with various valves incorporated in the apparatus, providing a means for a user to configure the apparatus for normal and regeneration modes and to program the time interval between and the duration of normal and regeneration mode cycles automatically.

5. The water treatment and filtration apparatus as in claim 1 wherein the outlet cylinder further comprises a sight glass and streamers disposed to flutter when water flows through the outlet cylinder providing a visual indication through the sight glass of the presence of flow.

6. The water treatment and filtration apparatus as in claim 1 further comprising a diffuser fixed to the bottom of the tank return pipe.

7. The water treatment and filtration apparatus as in claim 1 wherein the upper portion of the filter bed comprises zeolite selected from the group consisting of clinoptiloite and mordenite.

8. The water treatment and filtration apparatus as in claim 1 wherein the lower portion of the filter bed is pea gravel and covers the bottom end of the tank outlet manifold.

9. The water treatment and filtration apparatus as in claim 1 further having a regeneration mode configuration wherein water is backwashed through the filter bed and discharged to a drain.

10. The water treatment and filtration apparatus as in claim 9 wherein high pressure treated water from the storage tank is utilized to backwash the filter bed in regeneration mode.

11. The water treatment and filtration apparatus as in claim 9 wherein source water is utilized to backwash the filter bed when the apparatus is in regeneration mode.

* * * * *